Nov. 28, 1967  L. JORON  3,354,708

TESTING MACHINE FOR WRAPPED CONNECTIONS

Filed July 14, 1965  4 Sheets-Sheet 1

INVENTOR
L. JORON
BY Robert A. Cooke
ATTORNEY

United States Patent Office 3,354,708
Patented Nov. 28, 1967

3,354,708
TESTING MACHINE FOR WRAPPED
CONNECTIONS
Louis Joron, Issy-les-Moulineaux, France, assignor to International Standard Electric Corporation, New York, N.Y., a corporation of Delaware
Filed July 14, 1965, Ser. No. 471,949
Claims priority, application France, July 16, 1964, 981,869, Patent 1,412,452
9 Claims. (Cl. 73—133)

ABSTRACT OF THE DISCLOSURE

Testing machine for measuring the force necessary to strip wrapped connections from terminal lugs. The stripping force deflects a spring one end of which passes a series of contacts in sequence. Passage of these contacts actuates memory circuits which record stripping force and give indications of stripping forces which are either too low or too high.

---

Figure 1:
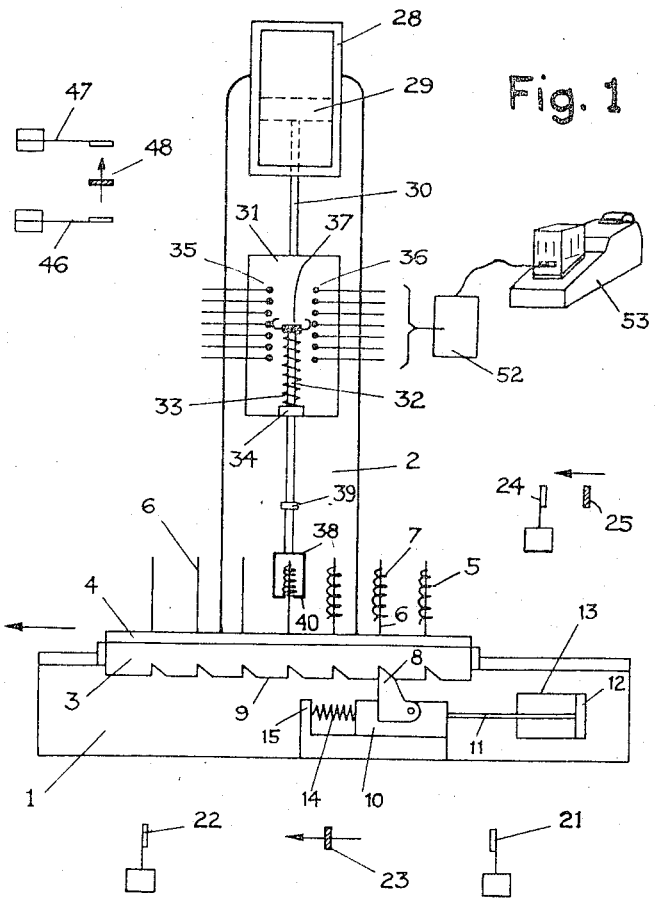

The present invention is an automatic machine allowing the testing of so-called "wrapped" connections. These connections are currently used in the electrical equipment industry and in the telephone equipment industry, etc. They are made with a tool called a "wrapping gun" which tightly wraps the end of a wire on a terminal peg or the like. The quality of these connections is obviously based upon the proper operation of the wrapping guns, which must be tested frequently. An object of the present invention is to allow the checking of the operation of the wrapping guns by testing connections produced with these guns used at test-pieces on an automatic machine which pulls out the wrapped wires and measures each time the pulling-out strain, with an alarm device operating when the strain does not reach a permissible minimum or when it exceeds a permissible maximum. The invention provides for the recording of the pulling-out strains, and more especially for separate recordings for lots of test-pieces produced with different wrapping guns, along with an addition effected for each lot allowing the determination of the average strain.

The machine according to the invention comprises the following means:

(a) A motor capable of pulling out the wrapped wire of a connection and of coming back to rest. This motor must have adequate power and should move preferably at a controlled speed, with no sudden acceleration when the connection gives way and is pulled out. A hydraulic piston is suitable for this purpose. Electromechanical parts such as valves controlled by electro-magnets are associated with this motor for controlling its working stroke and its return stroke. Electric contacts associated with this motor are operated in its position of rest and at the end of its stroke for controlling the machine's operation;

(b) A part capable of seizing the wrapped wire to pull it out from the peg. This device is preferably given the shape of a crow-bar which straddles the peg under the wrapped wire. It is understood that the pegs are solidly held in the machine by any appropriate means.

(c) A measuring part, inserted mechanically between the motor part and the seizing part, and capable of transmitting an increasing strain while measuring it. This measuring part is preferably a spring-balance with a rod which can slide in a box by pressing a calibrated spring. The visual indication of strain that the ordinary spring-balance gives, by means of a scale on which an index borne by the rod moves, will be replaced here by an electrical indication. For this purpose, the measuring part bears a series of electric contacts which close successively when the piston or another motor part applies an increasing strain to the connection until it gives way, so that the last closed contact indicates the pulling-out strain which was reached.

(d) An electric circuit which processes the indications given by the aforementioned contacts to memorize and record them. This circuit comprises a series of relays which are successively operated by the successive contacts. This circuit presents a series of output points, and each relay energises a corresponding output point. It is understood that the strain which has been reached when the connection gave way is translated by the closing of the contacts up to a certain point in the series, the operation of the relays up to a certain point of the chain and the marking of a corresponding output point.

(e) An adding machine, equipped with a device for the electrical control of the keys, associated with the above-mentioned output points in such a way that each marked output point causes the recording of a corresponding figure or number which represents the pulling-out strain.

The machine preferably also comprises means for engaging the crow-bar or other seizing part; means for moving forward, step by step, a crab bearing a row of test-piece connections; means for centering this crab in a working position; electromechanical parts such as valves with electromagnets or a motor electro-magnet, for controlling or constituting the various means above, and electric contacts operated by the mechanical parts of the machine, controlled by the above means, for controlling the operation of the machine by activating the appropriate electromechanical parts.

An alarm device is provided for signalling the tests in which the connection was pulled out with a strain which did not reach the permissible minimum, or with a strain which went beyond the permissible maximum.

Figures 2, 3:
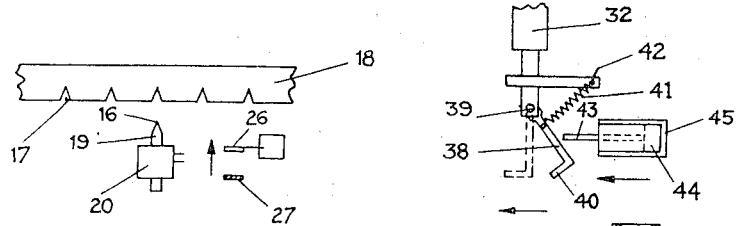
Figure 4A:
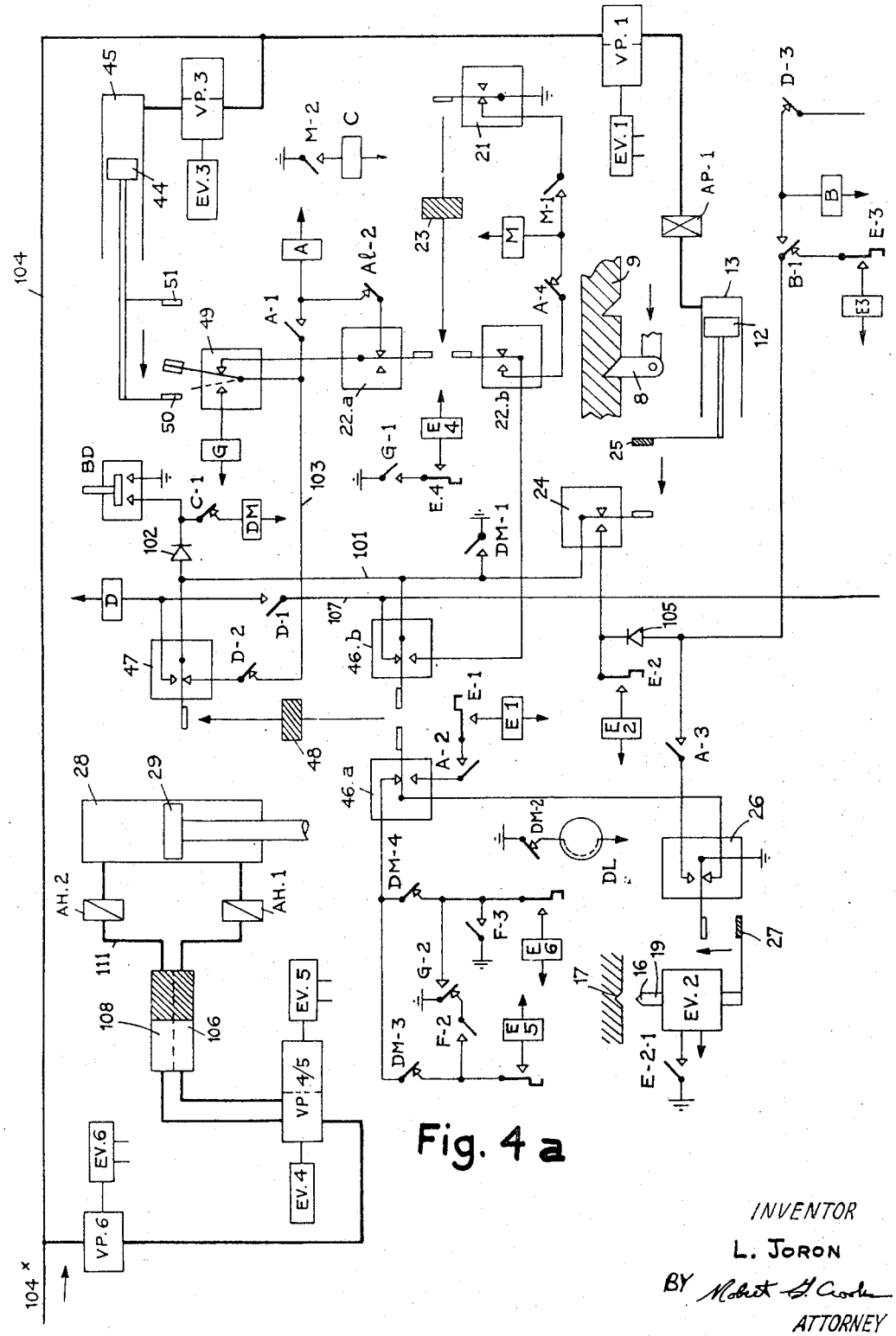
Figure 4:
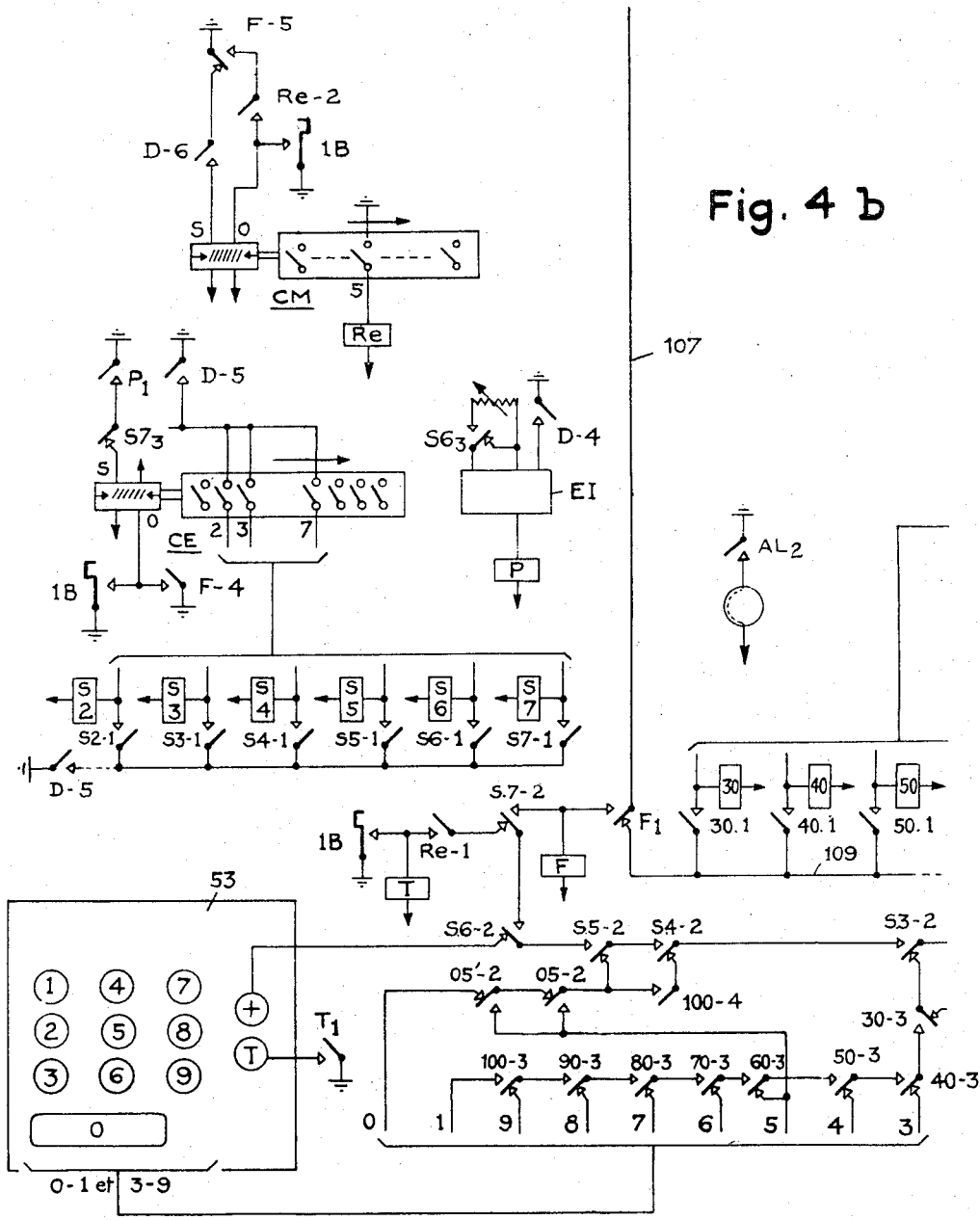
Figure 4C:
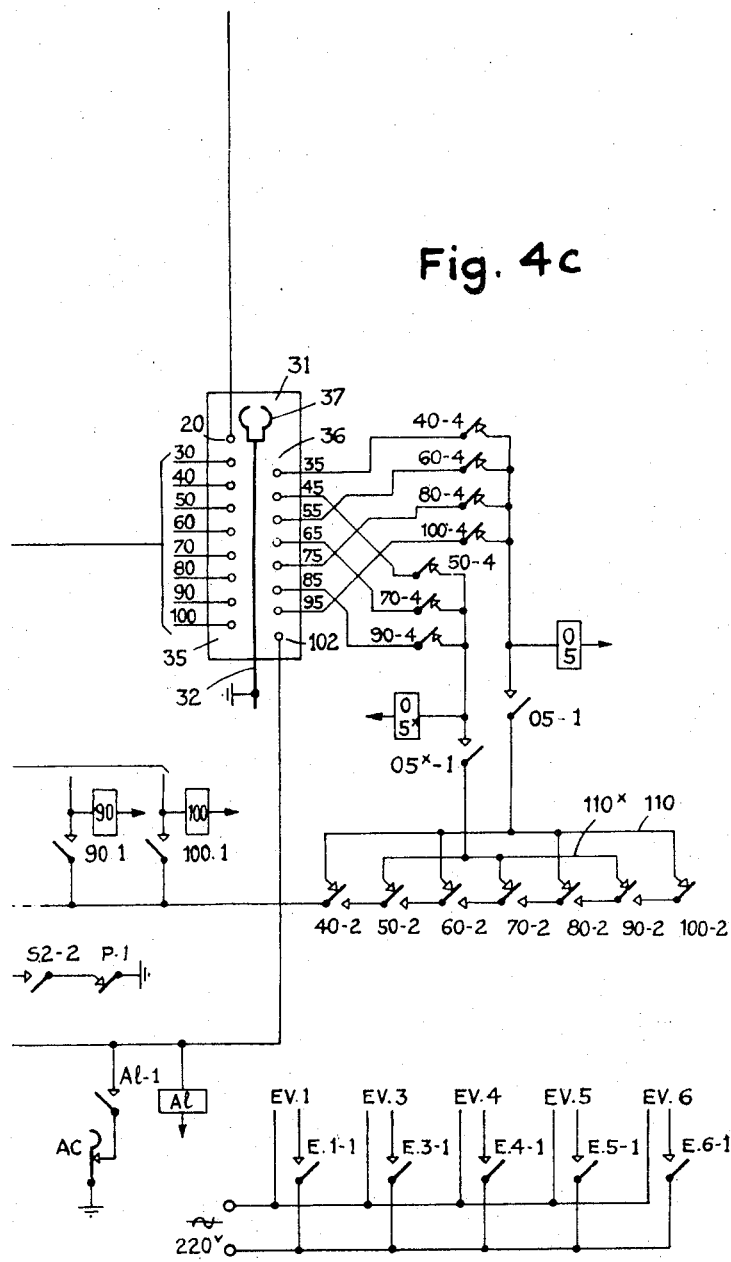

Other features and advantages of the invention will appear in the following description which refers to the accompanying drawings, in which:

FIGURE 1 represents in elevation the whole of a machine which is an embodiment of the invention, FIGURE 2 is a detail view showing the device which centers the machine's crab in its working positions, FIGURE 3 is a detail side view showing the crow-bar and the devices which engages it in a test-piece, and FIGURES 4a, 4b and 4c together constitute the diagram of the electric circuit which is used in this embodiment to insure the automatic operation of the machine in cooperation with the mechanical parts and the oil and air circuit which produces most of the motions in the machine.

Referring to FIG. 1, the machine comprises a frame composed of a bench 1 and a standard 2. The bench 1 bears a crab 3 on which a plate 4 is fixed, bearing a row of test-piece connections 5. These connections are each time made with pegs 6 which are solidly secured in the plate and on which wire twists 7 are wrapped with the wrapping guns to be checked. It can be assumed that it will suffice to produce and test five test-pieces with a gun to check the proper operation of the latter. It will be assumed that plate 4 bears twenty-five test-pieces divided in five lots of five test-pieces, each lot produced with a different gun. To test the successive test-pieces, crab 3 is moved step by step, from the right to the left of the drawing, by means of a pawl 8 which cooperates with a rack 9 integral with crab 3. The pawl 8 is mounted on a sliding block 10 which is pushed forward by rod 11 of a piston 12 which works in a simple pneumatic cylinder 13. The sliding block 10 is returned by a spring 14 which rests against an abutment 15 provided on bench 1. To center crab 3 in the successive working positions into which pawl 8 brings it, a device shown in FIG. 2 is provided, instead of the ordinary retaining pawl. This device comprises a tooth 16 which engages notches 17 formed in a bar 18 integral with crab 3. The tooth 16 is formed at the end of the movable magnetic core 19 of an electro-magnet 20. In this embodiment, it is assumed that the return of crab 3 to its starting position is effected by hand, as is the replacement of a plate 4 by another.

The stroke of crab 3 is checked by two spring contacts 21 and 22 cooperating with a lug 23 integral with the crab. In the starting position (on the right in the drawing), the lug 23 pushes contact 21 to the right, into its working position. As soon as the crab leaves this position, contact 21 comes back to its rest position. When the crab arrives at its end-of-stroke position (which is its last working position), the lug pushes contact 22 to the left, into its working position. As soon as the crab moves back to its starting position, contact 22 comes back to its rest position. The thrust of pawl 8 is checked by a spring contact 24 cooperating with a lug 25 integral with sliding-block 10. When the sliding block comes to the end of the stroke, moving forward the crab by one step, lug 25 pushes contact 24 to the left, into its working position. As soon as the sliding block moves backwards to its position of rest, contact 24 restores. The advance of centering tooth 16 is checked by a spring contact 26 controlled by a lug 27 integral with the movable core 19. When the core is attracted to its high centering position, lug 27 pushes contact 26 upwards, into its working position. As soon as the core goes down again (after a connection has been pulled out) contact 26 restores.

The standard 2 bears a vertical double-acting hydraulic cylinder 28, in which a piston 29 moves between a low position of rest and a high end-of-stroke position. Under cylinder 28, rod 32 of the piston bears the body 31 of a spring-balance in which a rod 32 slides up and down, pressing on a calibrated spring 33. The compression of this spring is limited by an abutment 34, so that strains exceeding this level of compression are transmitted by this abutment. The body 31 bears contact studs forming a left-hand series 35 and a right-hand series 36, and rod 32 bears a sliding contact 37 which comes into contact with the successive pairs of studs. The stud activated by contact with the sliding contact electrically indicates the position of rod 32 in body 31, which measures the strain transmitted by the compression of calibrated spring 33. Under body 31, rod 32 bears a crow-bar 38 which is jointed in 39 and which is terminated at its lower end by a horizontal fork 40 which engages the pegs 6 under the twists 7 to pull the latter upwards and out. In its position of rest (FIG. 3), the crow bar is drawn aside from its engaged position by a spring 41 coupled to a pin 42 affixed to rod 32. The crow-bar is pushed into its engaged position (from right to left on FIG. 3) by rod 43 of a piston 44 which works in a single-acting pneumatic cylinder 45.

The vertical stroke of the hydraulic piston 29 is checked by two spring contacts 46 and 47 controlled by a lug 48 carried by this piston (or the body 31 of the spring-balance). In the lower position of rest, lug 48 pushes contact 46 downwards, into its working position. As soon as the piston leaves this position, contact 46 restores. When the piston arrives at its higher end-of-stroke position, lug 48 pushes the other contact 47 upwards, into its working position. As soon as the piston begins to go down again, contact 47 restores. The engagement of the crow-bar (FIG. 3) is checked by a two-position contact 49, cooperating with two lugs 50, 51, carried by the crowbar. When the crow-bar is in its side position of rest, lug 50 pushes contact 49 to the right. The contact remains in this position when the crow-bar moves forward. When the crow-bar comes to its position of engagement, the other lug 51 pushes contact 49 to the left. Contact 49 remains in this position when the crow-bar withdraws, until lug 50 pushes it again to the right, when the crowbar reverts to its position of rest.

Block 52 represents an electric circuit which insures the automatic operation of the machine and which stores the electrical measure of the pulling out strain each time, and then records the number corresponding to this strain in an adding machine 53. This circuit includes, on the one hand, the various contacts mentioned which check the motions of the machine, and on the other hand, the studs which measure the compression of the calibrated spring in the spring-balance.

The operation of the machine, broadly stated, is as follows:

A plate 4 bearing a row of connections 5 is secured on crab 3 which is placed in its starting position (on the right in FIG. 1). The hydraulic piston 29 is in its lower position of rest. Rod 32 is in its higher position of rest in the body of the spring-balance. The crow-bar is in its side position of rest. Sliding-block 10 and centering core 19 are also at rest. The power supply is connected to the electric circuit and a starting button—which is not shown—is pressed. Air is then admitted into cylinder 13. Piston 12 pushes sliding block 10, and pawl 8 makes crab 3 move forward to its first working position, where the first test-piece 5 is placed under the pulling-out device. At the end of the stroke, pawl 8 closes contact 24 which energizes the centering electro-magnet 20. Tooth 16 engages the first notch 17. Contact 26 closes, cuts the air flow in cylinder 13, and sends the air into cylinder 45 of the crow-bar. The latter moves forward and engages its fork 40 under twist 7 of the connection. At the end of the stroke, it pushes contact 49 to the left (FIG. 3). This contact sends the oil under piston 29, which begins to move upwards. The body 31 of the spring-balance goes up with piston 29 while the crow-bar is held in position under twist 7. Consequently, rod 32 slides in body 31, pressing on calibrated spring 33. Sliding contact 37 passes first an advanced stud which cuts the air flow in cylinder 45. It then passes the successive studs 35, 36, and circuit 52 stores the indications yielded by these contacts. At some time, the strain transmitted by spring 33 becomes such that the connection gives way. This strain is indicated by the stud 35 or 36 which was reached at that time and which will not be passed. Circuit 52 stores this indication. Twist 7 slides on peg 6, and is then torn away from it. Rod 32 goes up again in body 31, to its higher position of rest.

The hydraulic piston 29 finally reaches its higher position, where the twist has been surely pulled out, even if the connection was to tough, owing to the power of this piston and to the direct action of abutment 34. However, if the strain exceeded the permissible maximum, a last stud 35 or 36 was reached, which operates an alarm device. Likewise, the alarm device is operated if the pulling-out strain did not reach a permissible minimum; this would have been marked by circuit 52 as even the first stud—which would indicate the smallest permissible strain—will not have been. In the higher position of piston 29, contact 47 closes and puts a timed sequencing device (comprised in circuit 52) to work. The indication yielded by studs 35, 36 is analyzed; it is then registered on the adding machine 53.

It is provided that after every fifth test-piece (i.e., for each lot produced with the same gun), the sum of the pulling-out strains is computed (which allows computation of the average strain) and the machine tape, left blank, moves forward in order to leave an adequate space between groups of numbers relating to different tools.

When the recording on machine 53 is finished, the timing device causes the admission of oil against piston 29 to make it go down. When the piston has reverted to its lower position, contact 46 initiates a new test cycle on the next test-piece, moving crab 3 one step forward, to begin. When the crab finally comes to its last working position, lug 23 operates contact 22. The cycle of the last test takes place in the ordinary way, but when piston 29 goes down again, after this test, contact 46, by action of contact 22, stops the whole machine instead of moving the crab forward again for another test.

Referring to FIGS. 4a and 4b, the electric circuit which insures the automatic operation described above will be now described. It is assumed here that it is a direct-current circuit, fed, for instance, by a rectifier connected to the mains. However, the valves of the pneumatic circuit are equipped with electro-magnets which operate on the alternating current of the mains (assumed to be 220 v.).

When the general power supply of this circuit is applied, the lamp DL, FIG. 4a, lights up through a break contact, DM–2, of a starting relay DM. With the plate bearing the test-pieces secured on crab 3 and the latter placed in its starting position, the starting button BD is pressed. This button grounds relay DM through a break contact C–1 of a relay C, which will be operated after all test-pieces have been tested, to stop the machine. Relay DM operates, and its contact r–DM–2 switches lamp DL off. Its make contact DM–1 grounds wire 101. Relay DM is locked on this wire by a rectifier cell 102 under the control of contact r–C–1, and button BD can be released. Relay A is immediately operated by wire 101 through mechanical contact 47 at rest, a break contact D–2 of a relay D— which will be operated at the end of stroke of the pulling-out device—wire 103, mechanical contact 49 placed on the right, mechanical contact 22.a at rest, and a break contact A1–2 of an alarm relay—which will be operated if the tested connection is too loose or too tight. Relay A is locked on wire 103 through its contact t–A–1, independently of mechanical contacts 49 and 22a. With the key E.1 depressed, relay E.1 operates on a ground applied by the centering contact 26 at rest, mechanical contact 46a at work, and a contact t–A–2. The valve electro-magnets in the pneumatic circuit operate on the mains. The electro-magnet EV.1 of valve V.P. 1 is activated by the mains (220 v.) through a contact t–E.1–1 (FIG. 4b). The compressed air is sent, through a pipe 104, to pneumatic cylinder 13, under the control of valve VP.1 and of dash-pot AP.1. Piston 12 pushes pawl 8 and makes the rack 9 move forward one step. Mechanical contact 21 comes to rest, which has no effect for the time being.

At the end of stroke of the pawl, lug 25 pushes mechanical contact 24. With the key E.2 depressed, relay E.2 operates by wire 101 through contact 24 at work. The centering electro-magnet EV.2 (which is the electro-magnet 20 of FIG. 2) is directly energized by a ground through contact t–E.2–1. Core 19 is attracted upwards, tooth 16 engages in a notch 17, and lug 27 pushes contact 26.

This contact breaks the circuit of relay E.1 which releases, followed by electro-magnet EV.1. Valve VP.1 closes again, and pawl 8 reverts to rest. Mechanical contact 24 reverts to rest and breaks the operating circuit of relay E.2. However, mechanical contact 26 at work holds this relay through a cell 105 and a contact t–A–3. With the key E.3 depressed, mechanical contact 26 also energizes relay E.3 under the control of a break contact B–1 of a relay B which will operate at the beginning of the pulling out. A contact t–E.3–1 (see the circuit operating on 220 v. in FIG. 4b) energizes electro-magnet EV.3 of valve VP.3. The latter sends the air of pipe 104 to cylinder 45 of the crow-bar. Piston 44 pushes the crow-bar to seize the connection to be tested.

At the end of stroke of the crow-bar, lug 51 pushes mechanical contact 49 to the left. This contact connects relay G to wire 103. Relay G operates. Its contacts t–G–1 and t–G–2 energize relays E.4 and E.6 respectively, whose keys with the same reference characters have been depressed. Contacts t–E.4–1 and t–E.6–1 (circuit on 220 v., FIG. 4b) energize electro-magnets EV.4 and EV.6 of valves VP 4/5 and VP.6. Valve VP 4/5 remains in the position in which it has been placed. Through valves VP.6 and VP.4/5 pushed to the right, the air of pipe 104' is admitted in part 106 of an air-oil transmitter. The latter sends oil (which flows in a closed circuit), through a dash-pot AH.1, in hydraulic cylinder 28, under piston 29. The piston begins to go up with the body of the spring-balance. Lug 48 leaves mechanical contacts 46.a–b, which revert to rest, which has no effect for the time being.

As the crow-bar is held in position in the connection, rod 32 of the spring-balance remains stationary and, consequently, goes down in body 31 of the spring balance, which goes up (FIG. 4b). The calibrated spring (33, FIG. 1) is pressed, and sliding contact 37, which is connected to the ground (FIG. 4b), contacts the advanced stud "20". Relay B (FIG. 4a) is operated on this stud under the control of a contact r–D–3 and is locked, through its t–B–1 contact, on contact 26, at work, while contact r–B–1 releases relay E.3. Electro-magnet EV.3 is switched off, valve VP.3 closes, and piston 44 reverts to rest, while the crow-bar remains engaged in the connection. One will notice that the advanced stud "20" is reached even in the case of an over-loose connection, produced by a faulty gun. If the connection holds good within the permitted limits, sliding contact 37 passes successively studs "30, 40 . . . " on one side and "35, 45 . . . " on the other side, until the connection gives way. After that, the spring of the spring-balance makes the crow-bar go up, and the sliding contact goes up, and the sliding contact goes up again in the body of the spring-balance. The indications yielded by the passing of the sliding contact on the stud are stored and used by circuits to be described below.

The pulling-out piston 29 comes to the end of stroke where mechanical contact 47 (FIG. 4a) is operated by lug 48. This contact connects relay D to wire 101. Relay D operates and becomes locked by t–D–1 on wire 107, which is connected to wire 101 by mechanical contact 46a at rest. At the same time, contact 47 switches off relays A and G, which release. Relays E2 and B are switched off contact t–A–3 and release. Electro-magnet EV.2 is switched off, and its core falls back. Mechanical contact 26 reverts to rest, which has no effect for the time being. Relays E.4 and E.6—E.6 are switched off on contacts t–G–1 and t–G–2, and release. Electro-magnets EV.4 and EV.6 are switched off, and the latter closes valve VP.6.

Relay D controls the operation of the timing device, which causes the transfer to the adding machine 53, of indications received from the studs of the spring-balance. At the end of the time period, after this transfer, the timing device operates a relay F (FIG. 4b). Key E.5 being depressed like key E.6, contact t–F–2 operates relay E.5 on the ground of r–G–2, and contact t–F–3 again operates relay E.6. Electro-magnet EV.5 is energized by t–E.3–1 (circuit 220 v., FIG. 4b) and pushes valve VP.4/5 to the left. Electro-magnet EV.6 again opens valve VP.6. Air enters part 108 of the air-oil transmitter which sends the oil, through dash-pot AH.2, into cylinder 28, against piston 29. The latter begins to go down. Mechanical contact 47 reverts to rest, which has no effect for the time being.

When piston 29 reverts to its lower position, lug 48 again pushes mechanical contacts 46.a–b. Contact 46.a has no effect for the time being. Contact 46.b separates wire 107 from wire 101. Relay D is released, as is relay F, which likewise held connected to wire 107. Relays E.5 and E.6 are switched off, release, and switch off electro-magnets EV.4 and EV.6. Valve VP.6 closes. As the crow-bar has reverted to its position of rest, lug 50 brings mechanical contact 49 back to its right-hand position. The whole circuit is then in its initial position again, with relay DM at work, and a new work cycle begins immediately: relay A operates, etc.

For the testing of the last test-piece, pawl 8 puts crab 3 into its last working position, where lug 23 pushes mechanical contact 22a–22b into its working position. Contact 22a at work switches off the operation circuit of relay A. However, as relay A already operated before the movement of pawl 8, and was locked independently of contact AAa, the test still takes place in a normal way. Nevertheless, when the pulling-out piston goes down again after this test, relay A can operate no longer. Relay M now operates on wire 101 through mechanical contact 46b energized, mechanical contact 22b at work and a contact r–A–4, and is locked through its t–M–1 contact to ground through mechanical contact 21 at rest. Relay C operates grounded through t–M–2. Relay DM is switched off by r–C–1, and is released and switches off the ground of wire 101. The machine is thus stopped with relays M and C energized and lamp DL lighted. Relay M will be switched off when crab 3 is again put into starting position, lug 23 then pushing mechanical contact 21 closed. Relay C, switched off by t–M–2 becomes released with relay M.

In the event of the pulling-out piston having been lifted by hand, a circuit for automatic return to the lower position is provided, operating as soon as the general power supply of the control circuit is restored. Both relays E.5 and E.6 are then grounded through centering contact 26 at rest, lower position contact 46a at rest and contacts r–DM–3 and r–DM–4. Electro-magnets EV.5 and EV.6 operate, and send oil against piston 29. The latter goes down. In the lower position, the lug pushes contact 46a, which switches off relays E.5 and E.6, and the piston stops.

Referring to FIG. 4b, the storing and recording circuit will now be described together with its timing device.

The studs set on the spring-balance are designated by numbers which represent the strain transmitted by the calibrated spring when sliding contact 37 passes against these studs: "30" for 3 kgs, "35" for 3.5 kgs, etc. Studs 35 indicate "round figures": 30, 40, 50, etc. They control the tens digit: 3, 4, 5, etc., to which the units digit "0" will be automatically added unless the sliding contact passes a "half" stud 36 without reaching the next "round figure" stud. In this case, the circuit will cause the units digits "5" to be recorded. Studs 36 then indicate the "half" numbers: 35, 45, 55, etc. It is then necessary for the substitution of a "5" for a "0" to be caused each time the sliding contact passes a stud in the 36 series and to be cancelled each time the sliding contact then passes a stud in the 35 series. It is moreover necessary for the indication yielded when the connection gives way—either a "round figure" like "40" or a "half" number like "45"—not to be altered by the sliding contact passing back over the same studs, when rod 32 moves up again in the body 31 of the spring-balance after the pulling-out of the connection. Moreover, the invention provides for the advanced stud already mentioned above, designated by "20," but which does not necessarily correspond to a 2 kgs. strain, as this stud is always reached by the sliding contact in practice, even with an over-loose connection. The defect of an over-loose connection will be ascertained by the storage circuit if the sliding contact does not reach the first measurement stud "30." A last stud "102" is also provided, which will be reached only with an over-tight connection and which will indicate this defect. Both defects operate the same alarm device, for both will have the same consequence, to wit, the replacement of the defective mandrel on the wrapping gun. It goes without saying, however, that these defects could be signalled separately, if necessary.

It has been seen above that the passing of the sliding contact over the advanced stud "20" operates relay B through r–D–3 (FIG. 4a). The passing of the sliding contact over the "integer" measurement studs operates directly the corresponding store relays "30," "40" . . . "100." These relays are locked, by their respective contacts t–30–1, t–40–1, etc. to a wire 109 which is connected to wire 107 by r–F–1. Thus, if for instance relays "30" to "50" were operated while relays "60" to "100" remained at rest, this means that the connection gave way under a strain of between 5 and 6 kgs. It is obvious that the passing of the sliding contact over the same studs "50" to "30" in the backward direction will have no effect on the condition of the store relays. The passing of the sliding contact on the "half" studs 36 alternately operates two "half" relays, 05 and 05′: studs "35, 55, 75 and 95" are connected to relay 05 by contacts r–40–4, r–60–4, r–80–4 and r–100–4 respectively; and studs "45, 65 and 85" are connected to relay 05′ by contacts r–50–4, r–70–4 and r–90–4 respectively. Relays 05 and 05′ are locked by their contacts 05–1 and 05′–1 respectively on two wires 110 and 110′ which are alternately connected to wire 109 by a chain of transfer contacts of all measurement relays (except the first one), 40–2 to 100–2. The operation of each store relay "40" to "100" therefore suppresses the ground on one of the wires 110 or 110′ and applies it to the other one. Thus, stud "35" operates relay 05 by r–40–4 and this relay is locked on wire 110 connected to wire 109 through r–40–2. When the sliding contact passes stud "40," the operation of relay "40" transfers the locking ground to wire 110′ by t–40–2, r–50–2. The suppression of the ground on wire 110 releases relay 05, which cannot be operated any longer when the sliding contact passes back over stud "35" on its return, because the operation circuit of this relay is also cut by r–40–4. When stud "45" is passed, relay 05′ is operated through contact r–50–4. When stud "50" is passed relay "50" operates and transfers the locking ground from wire 110′ to wire 110 by t–50–2, r–60–2 and breaks the operation circuit of relay 05′ by contact r–50–4. When stud "55" is reached, relay 05 operates again by r–60–4 and is locked to wire 110. If the connection gives way for a strain between 5.5 and 6 kgs., the sliding contact does not reach stud "60," and the pulling-out strain is stored by the setting of relays "30," "40," "50" and "05." If stud "100" is reached, relay "05" is unlocked on contact r–100–2, while relay 05′ was unlocked on stud "90." Both "half" relays are therefore at rest in this case. Finally, if stud "102" is reached, the alarm relay AL is directly operated and is locked by t–Al–1 to ground controlled by a spring-key AC. It will be seen further on how this same relay will be operated in the case of an over-loose connection.

When the pulling-out device reaches its higher position, relay D (FIG. 4a) is operated, as was seen above. The connection surely has been pulled out, even if it was over-tight, and the advanced stud "20" surely has been reached, even if the connection was over-loose. A generator of periodic pulses EI is put to work by t–D–4 and makes relay P pulse (FIG. 4b). The pulses repeated by this relay—by contact t–P–1—are applied through r–S.7–3 to the electro-magnet of a pulse counter CE which they cause to progress step-by-step. This counter is here assumed to be a switch as described in the French Patent No. 1,131,665 filed on Sept. 23, 1955, by International Standard Electric Corp. (invention H. Steinbach, R. Sheidig 24–11). This switch comprises a position of rest and ten successive working positions. These positions are controlled by the successive attraction of ten separate armatures, which are held—after the pulses—by the remanence of their magnetic circuit. In the position of rest, this switch closes a "break" contact not shown. In each working position, it closes a separate "make" contact. To set the switch at rest again, a releasing coil opposed to the progression coil is energized. This opposed coil suppresses the magnetic remanence and thus releases the armature which was held in the working position.

In its positions "2" to "7," the counter CE operates the sequence relays S.2 to S.7 by a ground controlled by t–D–5. These relays are connected by their respective contacts t–S.2–1 etc. . . . to the same ground t–D–5. They cause a chain of transfer contacts S.2–2 etc. . . . to progress; this chain is fed under the control of a contact r–P–1, i.e. between the moment when contact t–P–1 operates switch CE and when the switching occurs in this chain of contacts. At instant "2," the contact t–S.2–2 feeds through r–S.3–2 a chain of transfer contacts 30–3 to 100–3. This chain was set in place by the pulling-out device. If the connection is loose, all these relays "30" etc. . . . remain at rest, and the alarm relay Al is operated by r–30–3 and is locked as was said above. If the "round figure" relays were operated up to one of them, for instance, relays "30" and "40," the chain 30–3, etc. . . . operates the corresponding key of machine 53, to wit, key "4" by t–30–3, t–40–3, r–50–3, for recording the tens figures. If all these relays have been operated, including relay "100," key 1 is operated for the hundreds figure. The tens figure "0" will be recorded in this case at time "3," by t–S.3–2, r–S.4–2 and t–100–4, passing through contacts r–05–2 and r–05'–2 in the represented circuit.

The units figure is registered at time "4" by t–S.4–2, r–S.5–2. This figure must be "0" for a strain expressed by a "round figure." The two "half" relays 05 and 05' being then at rest, key "0" is operated by t–S.4–2, r–S.5–2, r–05–2 and r–05'–2. For a strain expressed by a "half," the figure should be "5." One of relays 05 or 05' is then energized, and key "5" is operated by t–05–2 or by r–05–2, t–05'–2. The number so registered is printed at time "5" owing to the fact that key "+" is reached by r–S.5–2, r–S.6–2. Time "6" is intended for an addition which takes place after a series of pulling-outs, five for instance, as will be seen further on. Finally, at time "7," relay F is operated by t–S.7–2 and is locked by t–F–1 on wire 107. It has been seen above that the operation of this relay causes the pulling-out device to return to rest (the lowering of the hydraulic piston 29). It makes switch CE revert to rest by energizing its release coil by t–F–4. It breaks wire 109 on r–F–1, which unlocks relays "30," etc. and, as the case may be, relay 05 or 05'. The sequence relays S.2 etc. will be unlocked when relay D will release, when the pulling-out device will revert to its lower position.

After each series of five test-pieces, the total of the pulling-out strains is carried out. For this purpose, the pulling-out cycles are counted by a switch counter CM similar to counter CE. The progression coil of counter CM is energized each time relay D is operated and remains energized until relay F operates: ground, r–F–5, t–D–6, progression coil. In position "5," counter "CM" operates a relay Re. At time "6" of the sequence counter CE, relay T is operated by t–S.6–2, r–S.7–2, t–Re–1. A contact S.6–3 is inserted in the adjusting circuit of the pulse sender which lengthened this time "6" (which is considered, for the chain S.2–2 etc., upon resting of relay P, after the pulsing of this relay which caused the progression of counter CE, the operation of relay S.6 and the switching of contact S.6–2). Relay T operates key "T" by t–T–1, and machine 53 forms the total of the five recorded numbers. Key "T" remains depressed during the whole time "6," which was lengthened as was said. The paper tape of the machine continues to move forward and forms a blank which separates the numbers of the group of the five tests which have just been made, from those of the next group. It will be remembered that these groups of tests are carried out on test-pieces which were produced by different wrapping guns. The lengthening of time "6" is therefore meant to separate the results of tests relating to different tools on the machine paper tape.

When relay F operates on time "7," it energizes the releasing coil of counter CM by t–F–5, t–Re–2. The return to rest of this counter releases relay Re. At the next cycle, counter CM will again start counting the pulled-out test-pieces.

The foregoing description of an embodiment does not limit the invention, and various variants or modifications can be made without departing from the scope of this invention.

I claim:

1. A machine for testing wrapped connections by measuring the force required to strip a coil off the terminal around which said coil is wound, said machine including:
   (a) actuating means for applying force to cause motion of a member from a rest position through a stroke in a first direction and for returning said member in the opposite direction to said rest position;
   (b) electro-mechanical means, including contacts operated at said rest position and at the end of said stroke in said first direction, for controlling said actuating means and the motion of said member in both directions;
   (c) gripping means for applying force to strip said wound connection from said terminal;
   (d) resilient means coupling said gripping means to said actuating means through said member, said resilient means being so disposed as to deflect as a measure of the force transmitted therethrough from said actuating means and said member to said gripping means;
   (e) a series of electrical contacts so disposed as to be successively bridged by a member coupled to said gripping means, said contacts being coupled through said member to said actuating means whereby successive bridging of pairs of said contacts is an indication of the force applied to said resilient means;
   (f) a series of relays coupled to respective pairs of said series of electrical contacts for storing the indications of force applied to said resilient means; and
   (g) storage means responsive to said series of relays for preserving an indication of the force applied to said resilient means and transmitted through said gripping means to a wrapped connection under test.

2. A machine in accordance with claim 1, further including means for causing said gripping means to move into position in contact with said wrapped coil of said connection under test.

3. A machine in accordance with claim 1, further including means for carrying a plurality of test connections and means for causing said carrying means to move step by step so as to position successively each test connection in juxtaposition with said gripping means.

4. A machine in accordance with claim 3 in which said carrying means is energized by said electric contact which is operated in said rest position of said actuating means.

5. A machine in accordance with claim 3, further including means for centering each successive test connection under said gripping means.

6. A machine in accordance with claim 1 in which said storage means is energized through said contacts operated at the end of said stroke of said actuating means in said first direction.

7. A machine in accordance with claim 1, further including means for delaying the return of said actuating means to said rest position until after a given time interval permitting said storage means to record an indication of force applied to said test connection.

8. A machine in accordance with claim 3, further including means for stopping said machine at the termination of the step by step progress of said means for carrying a plurality of test connections.

9. A machine in accordance with claim 1, further including means for giving an alarm if the force recorded by said storage means fails to reach a given minimum or exceeds a given maximum.

References Cited

UNITED STATES PATENTS

| | | | |
|---|---|---|---|
| 1,967,114 | 7/1934 | Cutler | 74—578 X |
| 2,148,075 | 2/1939 | Kiner | 73—313 |
| 2,225,426 | 12/1940 | Aronson | 77—64 |
| 2,619,707 | 12/1952 | Young et al. | 77—64 X |
| 3,015,952 | 1/1962 | Clagett | 73—133 |
| 3,200,641 | 8/1965 | Stark | 73—138 |

FOREIGN PATENTS 324,455   11/1957   Switzerland.

RICHARD C. QUEISSER, *Primary Examiner.*

J. H. WILLIAMSON, *Assistant Examiner.*